United States Patent
Miller et al.

(10) Patent No.: US 11,093,765 B2
(45) Date of Patent: Aug. 17, 2021

(54) SYSTEMS AND METHODS FOR LOCATING TARGET VEHICLES

(71) Applicant: Ford Global Technologies, LLC, Dearborn, MI (US)

(72) Inventors: Thomas Lee Miller, Ann Arbor, MI (US); Brian Bennie, Sterling Heights, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 16/566,523

(22) Filed: Sep. 10, 2019

(65) Prior Publication Data

US 2020/0019800 A1 Jan. 16, 2020

Related U.S. Application Data

(63) Continuation of application No. 15/334,039, filed on Oct. 25, 2016, now Pat. No. 10,410,074.

(51) Int. Cl.
*G06K 9/00* (2006.01)
*B60R 1/00* (2006.01)
*H04N 5/232* (2006.01)

(52) U.S. Cl.
CPC .......... *G06K 9/00825* (2013.01); *B60R 1/00* (2013.01); *G06K 9/00805* (2013.01); *H04N 5/23245* (2013.01); *B60R 2300/80* (2013.01)

(58) Field of Classification Search
CPC .......... H04N 5/23245; G06K 9/00825; G06K 9/00805; B60R 1/00; B60R 2300/80
See application file for complete search history.

(56) References Cited

U.S. PATENT DOCUMENTS

| | | | |
|---|---|---|---|
| 8,543,254 B1* | 9/2013 | Schut | G06K 9/00825 701/1 |
| 2009/0074249 A1* | 3/2009 | Moed | G06K 9/00818 382/104 |
| 2010/0280751 A1* | 11/2010 | Breed | G08G 1/161 701/414 |
| 2011/0210867 A1* | 9/2011 | Benedikt | G08G 1/096725 340/905 |
| 2013/0088600 A1* | 4/2013 | Wu | G08G 1/054 348/149 |
| 2013/0257631 A1 | 10/2013 | Anand et al. | |
| 2015/0304649 A1* | 10/2015 | Hoffmann | G01S 15/931 348/148 |

(Continued)

FOREIGN PATENT DOCUMENTS

| DE | 102012011152 A1 | 12/2013 |
|---|---|---|
| JP | 2010-103694 A | 5/2010 |
| WO | 2016/103258 A1 | 6/2016 |

*Primary Examiner* — Neil R Mikeska
(74) *Attorney, Agent, or Firm* — Frank Lollo; Eversheds Sutherland (US) LLP (57) ABSTRACT

A vehicle includes: motor(s), local sensors, processor(s) configured to: receive an instruction including first properties of a target vehicle; verify the instruction; instruct the local sensors to scan at a first resolution; mark a scanned external vehicle, having second properties, as compatible or incompatible based on a comparison of the first and second properties; instruct the local sensors to scan at a second resolution upon marking the external vehicle as compatible.

23 Claims, 7 Drawing Sheets

(56) References Cited

U.S. PATENT DOCUMENTS

2016/0148510 A1\* 5/2016 Vanholme ................ G08G 1/16
                                                     703/6
2016/0214533 A1\* 7/2016 Doyle ................ H04N 1/00244
2017/0032402 A1\* 2/2017 Patsiokas ........... G06Q 30/0261

\* cited by examiner

SYSTEMS AND METHODS FOR LOCATING TARGET VEHICLES

This application claims the benefit of, priority to, and is a continuation of U.S. patent application Ser. No. 15/334,039, filed Oct. 25, 2016, the entire contents of which are incorporated by reference herein.

TECHNICAL FIELD

This disclosure relates to locating a target vehicle with a plurality of connected vehicles.

BACKGROUND

Authorities often wish to locate a target vehicle. To do so, authorities may issue a notification (e.g., an amber alert) describing features of the target vehicle. Drivers read the amber alert and attempt to identify the target vehicle. Upon identifying the target vehicle, drivers call the authorities to relay the target vehicle's location.

The current notification system is ineffective because a many drivers (a) do not see the notification, (b) ignore the notification, (c) forget about the notification, and/or (d) fail identify the target vehicle. An improved notification system is needed.

SUMMARY

A vehicle consistent with the present disclosure may include: motor(s), local sensors, processor(s) configured to: receive an instruction comprising first properties of a target vehicle; verify the instruction; instruct the local sensors to scan at a first resolution; mark a scanned external vehicle, having second properties, as compatible or incompatible based on a comparison of the first and second properties; instruct the local sensors to scan at a second resolution upon marking the external vehicle as compatible.

According to some embodiments, the second resolution exceeds the first resolution.

According to some embodiments, the local sensors are cameras configured to capture images at the first and second resolutions.

According to some embodiments, the processor(s) are configured to forward a verified instruction to surrounding vehicles.

According to some embodiments, the processor(s) are configured to verify the instruction by contacting an external server at a preloaded address.

According to some embodiments, the processor(s) are configured to pull the preloaded address from memory and without reference to the received instruction.

According to some embodiments, the processor(s) are configured to instruct the local sensors to scan at the second resolution until a predetermined number of subsequent scans fail to include the compatible external vehicle.

According to some embodiments, the local sensors comprise cameras and the vehicle further includes ultrasonic sensors.

According to some embodiments, the instruction comprises a gravity of each of the first properties and the processor(s) are configured to marked the scanned external vehicle as compatible or incompatible based on the gravities.

According to some embodiments, the processor(s) are configured to mark the external vehicle as being compatible even when some of the first properties fail to match some of the second properties.

According to some embodiments, the processor(s) are configured to further mark the compatible external vehicle as potentially compatible and fully compatible.

According to some embodiments, the processor(s) are configured to compute a compatibility confidence when the external vehicle is potentially compatible.

According to some embodiments, the compatibility confidence is based on the comparison of the first and second properties and gravities included in the received instruction.

According to some embodiments, the processor(s) are configured to compare the compatibility confidence to a threshold confidence and transmit raw images of the external vehicle based on the compatibility confidence exceeding the threshold confidence.

Disclosed is a method of controlling a vehicle, the vehicle may include motor(s), local sensors, and processor(s), the method may include, via the processor(s): receiving an instruction comprising first properties of a target vehicle; verifying the instruction; instructing the local sensors to scan at a first resolution; marking a scanned external vehicle, having second properties, as compatible or incompatible based on a comparison of the first and second properties; instructing the local sensors to scan at a second resolution upon marking the external vehicle as compatible.

According to some embodiments, the second resolution exceeds the first resolution, the local sensors are cameras configured to capture images at the first and second resolutions, and the method comprises: forwarding a verified instruction to surrounding vehicles and not forwarding an unverified instruction to the surrounding vehicles.

According to some embodiments, the method includes pulling a preloaded address from memory and verifying the instruction by contacting an external server at the preloaded address.

According to some embodiments, the method includes instructing the local sensors to scan at the second resolution until a predetermined number of subsequent scans fail to include the compatible external vehicle.

According to some embodiments, the method includes marking the compatible external vehicle as potentially compatible or fully compatible; computing a compatibility confidence when the external vehicle is potentially compatible, wherein the compatibility confidence is based on the comparison of the first and second properties and gravities included in the received instruction; comparing the compatibility confidence to a threshold confidence and transmitting raw images of the external vehicle based on the compatibility confidence exceeding the threshold confidence.

According to some embodiments, the method includes processing the first resolution scan at a lower frequency and processing the second resolution scan at a higher frequency.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present, as one option, and mutually exclusive alternatives as another option. In other words, the conjunction "or" should be understood to include "and/or" as one option and "either/or" as another option.

Figure 1:
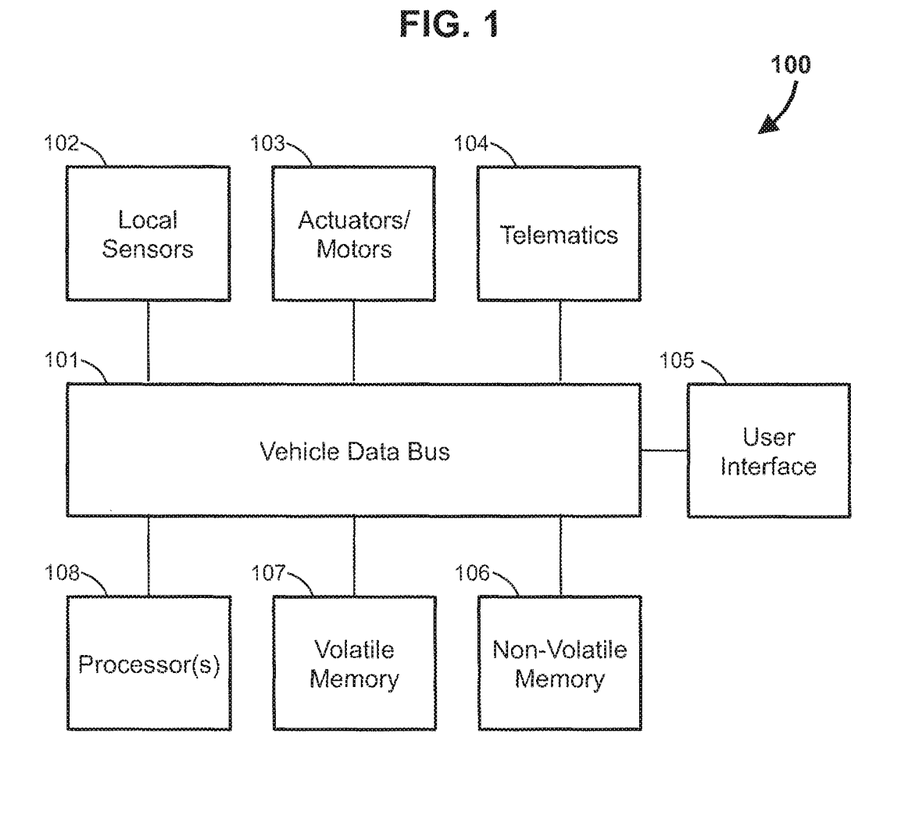
FIG. 1 is a block diagram of a vehicle computing system.

FIG. 1 shows a computing system 100 of first vehicle 200. First vehicle 200 is connected, meaning that first vehicle 200 is configured to (a) receive wireless data from external entities (e.g., infrastructure, servers, other connected vehicles) and (b) transmit wireless data to external entities. First vehicle 200 may be autonomous, semi-autonomous, or manual. First vehicle 200 includes a motor, a battery, at least one wheel driven by the motor, and a steering system configured to turn the at least one wheel about an axis. First vehicle 200 may be fossil fuel powered (e.g., diesel, gasoline, natural gas), hybrid-electric, fully electric, fuel cell powered, etc.

Vehicles are described, for example, in U.S. patent application Ser. No. 14/991,496 to Miller et al. ("Miller"), U.S. Pat. No. 8,180,547 to Prasad et al. ("Prasad"), U.S. patent application Ser. No. 15/186,850 to Lavoie et. al. ("Lavoie"), and U.S. patent application Ser. No. 14/972,761 to Hu et al. ("Hu"), all of which are hereby incorporated by reference in their entireties. First vehicle 200 may include any of the features described in Miller, Prasad, Lavoie, and Hu.

Computing system 100 resides in first vehicle 200. Computing system 100, among other things, enables automatic control of mechanical systems within first vehicle 200 and facilitates communication between first vehicle 200 and external entities (e.g., connected infrastructure 301, the Internet, other connected vehicles 201). Computing system 100 includes a data bus 101, one or more processors 108, volatile memory 107, non-volatile memory 106, user interfaces 105, a telematics unit 104, actuators and motors 103, and local sensors 102.

Data bus 101 traffics electronic signals or data between the electronic components. Processor 108 performs operations on electronic signals or data to produce modified electronic signals or data. Volatile memory 107 stores data for near-immediate recall by processor 108. Non-volatile memory 106 stores data for recall to the volatile memory 107 and/or the processor 108. Non-volatile memory 106 includes a range of non-volatile memories including hard drives, SSDs, DVDs, Blu-Rays, etc. User interface 105 includes displays, touch-screen displays, keyboards, buttons, and other devices that enable user interaction with the computing system. Telematics unit 104 enables both wired and wireless communication with external entities via Bluetooth, cellular data (e.g., 3G, LTE), USB, etc.

Actuators/motors 103 produce tangible results. Examples of actuators/motors 103 include fuel injectors, windshield wipers, brake light circuits, transmissions, airbags, motors mounted to sensors (e.g., a motor configured to swivel a local sensor 102), engines, power train motors, steering, etc. Local sensors 102 transmit digital readings or measurements to processors 108. Examples of local sensors 102 include temperature sensors, rotation sensors, seatbelt sensors, speed sensors, cameras, lidar sensors, radar sensors, infrared sensors, ultrasonic sensors etc. It should be appreciated that any of the various electronic components of FIG. 1 may include separate or dedicated processors and memory. Further detail of the structure and operations of computing system 100 is described, for example, in Miller, Prasad, Lavoie, and Hu.

Figure 2:
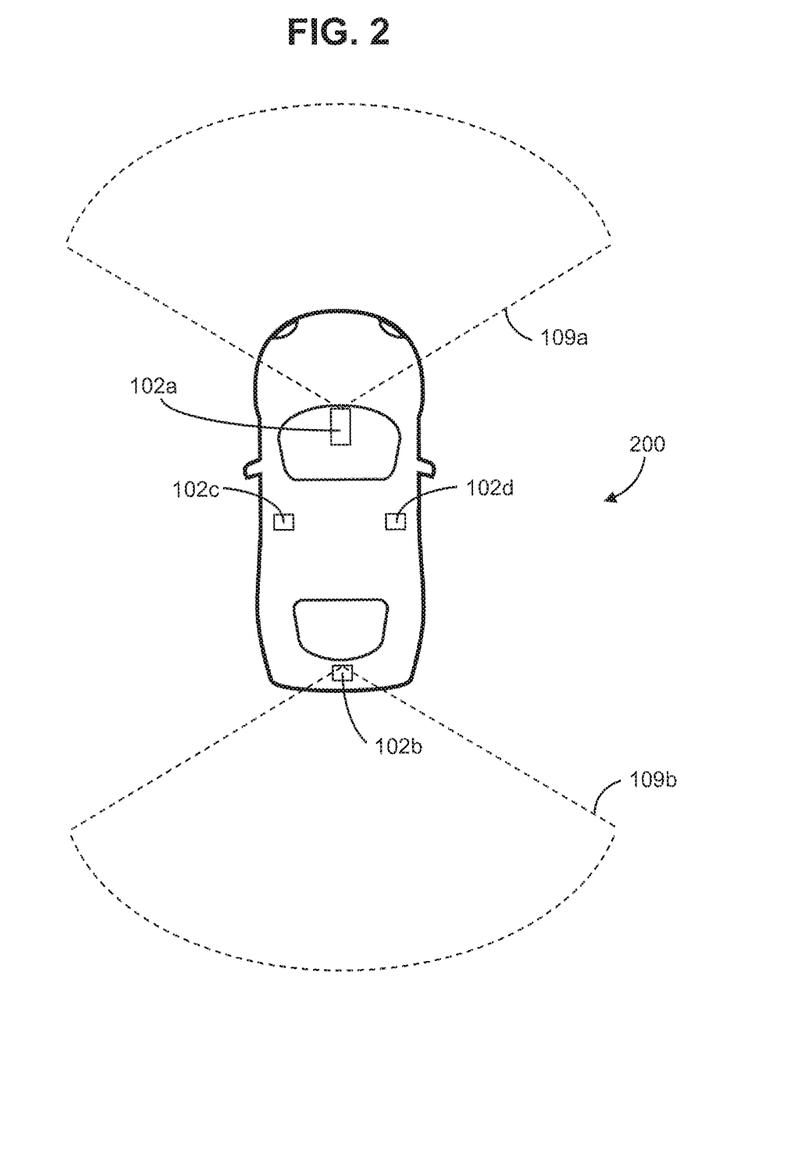
FIG. 2 is a top plan view of a vehicle including the vehicle computing system.

FIG. 2 generally shows and illustrates first vehicle 200, which includes computing system 100. Some of the local sensors 102 are mounted on an exterior of first vehicle 200 (others are located inside the vehicle 200). Local sensor 102a is configured to detect objects leading the vehicle 200. Local sensor 102b is configured to detect objects trailing the vehicle 200 as indicated by trailing sensing range 109b. Left sensor 102c and right sensor 102d are configured to perform similar functions for the left and right sides of the vehicle 200.

As previously discussed, local sensors 102a to 102d may be ultrasonic sensors, lidar sensors, radar sensors, infrared sensors, cameras, microphones, and any combination thereof, etc. First vehicle 200 includes a host of other local sensors 102 located in the vehicle interior or on the vehicle exterior. Local sensors 102 may include any or all of the sensors disclosed in Miller, Prasad, Lavoie, and Hu.

It should be appreciated that first vehicle 200 is configured to perform the methods and operations described herein. In some cases, first vehicle 200 is configured to perform these functions via computer programs stored on volatile 107 and/or non-volatile 106 memories of computing system 100.

A processor is "configured to" perform a disclosed method step or block at least when the processor is in operative communication with memory storing a software program with code or instructions embodying the disclosed method step or block. Further description of how processors, memory, and software cooperate appears in Prasad. According to some embodiments, a mobile phone or an external server in operative communication with first vehicle 200 perform some or all of the methods and operations discussed below.

According to various embodiments, first vehicle 200 includes some or all of the features of vehicle 100a of Prasad. According to various embodiments, computing system 100 includes some or all of the features of VCCS 102 of FIG. 2 of Prasad. According to various embodiments, first vehicle 200 is in communication with some or all of the devices shown in FIG. 1 of Prasad, including nomadic device 110, communication tower 116, telecom network 118, Internet 120, and data processing center 122.

The term "loaded vehicle," when used in the claims, is hereby defined to mean: "a vehicle including: a motor, a plurality of wheels, a power source, and a steering system;

wherein the motor transmits torque to at least one of the plurality of wheels, thereby driving the at least one of the plurality of wheels; wherein the power source supplies energy to the motor; and wherein the steering system is configured to steer at least one of the plurality of wheels."

The term "equipped electric vehicle," when used in the claims, is hereby defined to mean "a vehicle including: a battery, a plurality of wheels, a motor, a steering system; wherein the motor transmits torque to at least one of the plurality of wheels, thereby driving the at least one of the plurality of wheels; wherein the battery is rechargeable and is configured to supply electric energy to the motor, thereby driving the motor; and wherein the steering system is configured to steer at least one of the plurality of wheels."

Each of the external entities described in this application (e.g., the connected infrastructure, the other autonomous vehicles, mobile phones, servers) may share any or all of the features described with reference to FIGS. 1 and 2.

Figure 3:
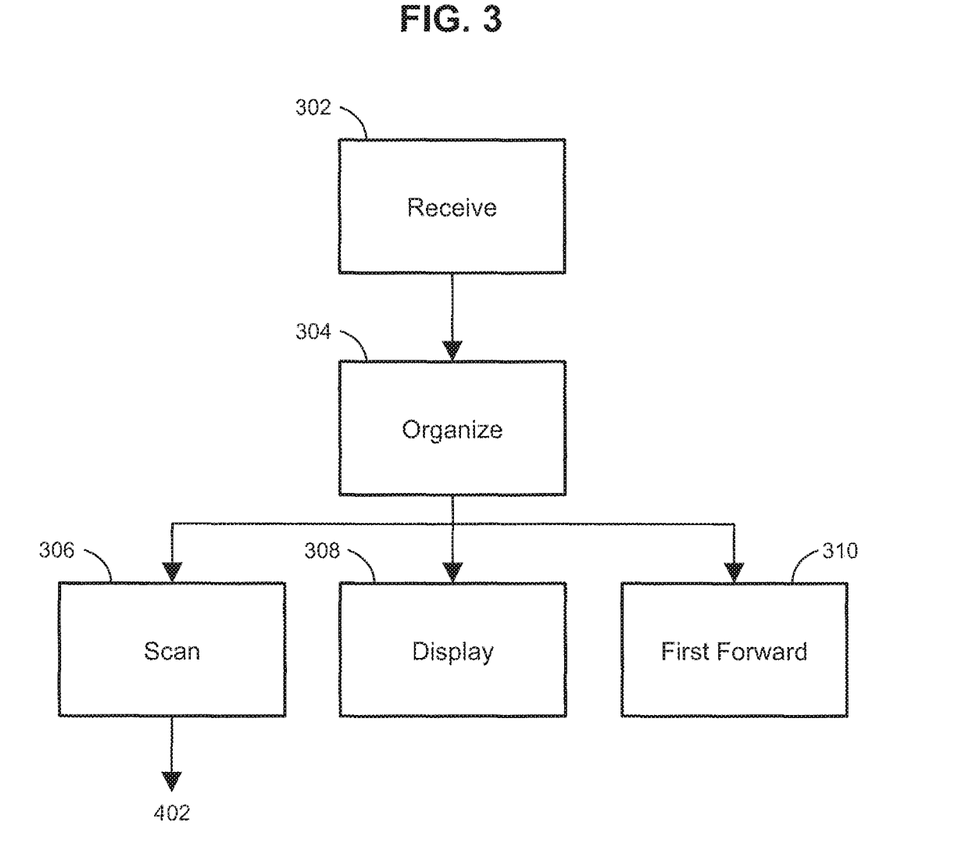
FIG. 3 is a block diagram of a method or receiving instructions.

First vehicle 200 is configured to (a) receive an instruction or data embodying an instruction to identify a target vehicle, (b) scan for target vehicle, and (c) transmit a message upon locating the target vehicle. With reference to FIG. 3, first vehicle 200 receives an instruction or data embodying an instruction at block 302. First vehicle 200 organizes and processes the instruction at block 304. During block 304, first vehicle 200 may contact an external server having a location or address preloaded into memory of first vehicle 200 to verify that instruction is authoritative (i.e., generated by an authority and not an individual). As an example, first vehicle 200 or the external server may compare each feature of the received instruction with each feature of a preloaded and accurate instruction to verify the instruction.

First vehicle 200 scans for the target vehicle at block 306. First vehicle 200 displays a message on an in-vehicle display (e.g., an LCD or LED display) with information related to the target vehicle at block 308. First vehicle 200 forwards an instruction at block 310 (referred to as the first forward). The forwarded instruction may be identical to the received instruction and thus represent a request or instruction for other connected vehicles to perform the methods and operations disclosed herein (i.e., a request or instruction for other connected vehicles to perform the methods and operations discussed herein with reference to first vehicle 200).

According to some embodiments, the forwarded request or instruction (referred to as the forwarded instruction) is a two-part message. A first message part is a low bandwidth message (i.e., a message having a small size). The first message part includes an identifier associated with the target vehicle (e.g., a unique code assigned to the target vehicle, such as a license plate number, or a unique code assigned to the alert). In response to the first message part, connected vehicles reply to first vehicle 200. The reply includes a binary indication as to whether the respective connected vehicle has already received the instruction to locate the target vehicle. If the reply indicates that the respective connected vehicle has already received the instruction, then first vehicle 200 takes no further action with respect to the respective connected vehicle. If the reply indicates that the respective connected vehicle has not received the instruction, then first vehicle replies with a second message part.

The second message part is a high bandwidth message (i.e., a message having a large size). The second message part embodies the instruction received at the first vehicle 200 and is thus more detailed than the first message part (e.g., the second message part includes all relevant details embodied in the instruction received at first vehicle 200, including, for example, make of target vehicle, model of target vehicle (including color), a security certificate of the target vehicle (connected vehicles may periodically issue unique security certificates to other connected vehicles) and other distinguishing features of the target vehicle).

Figure 4:
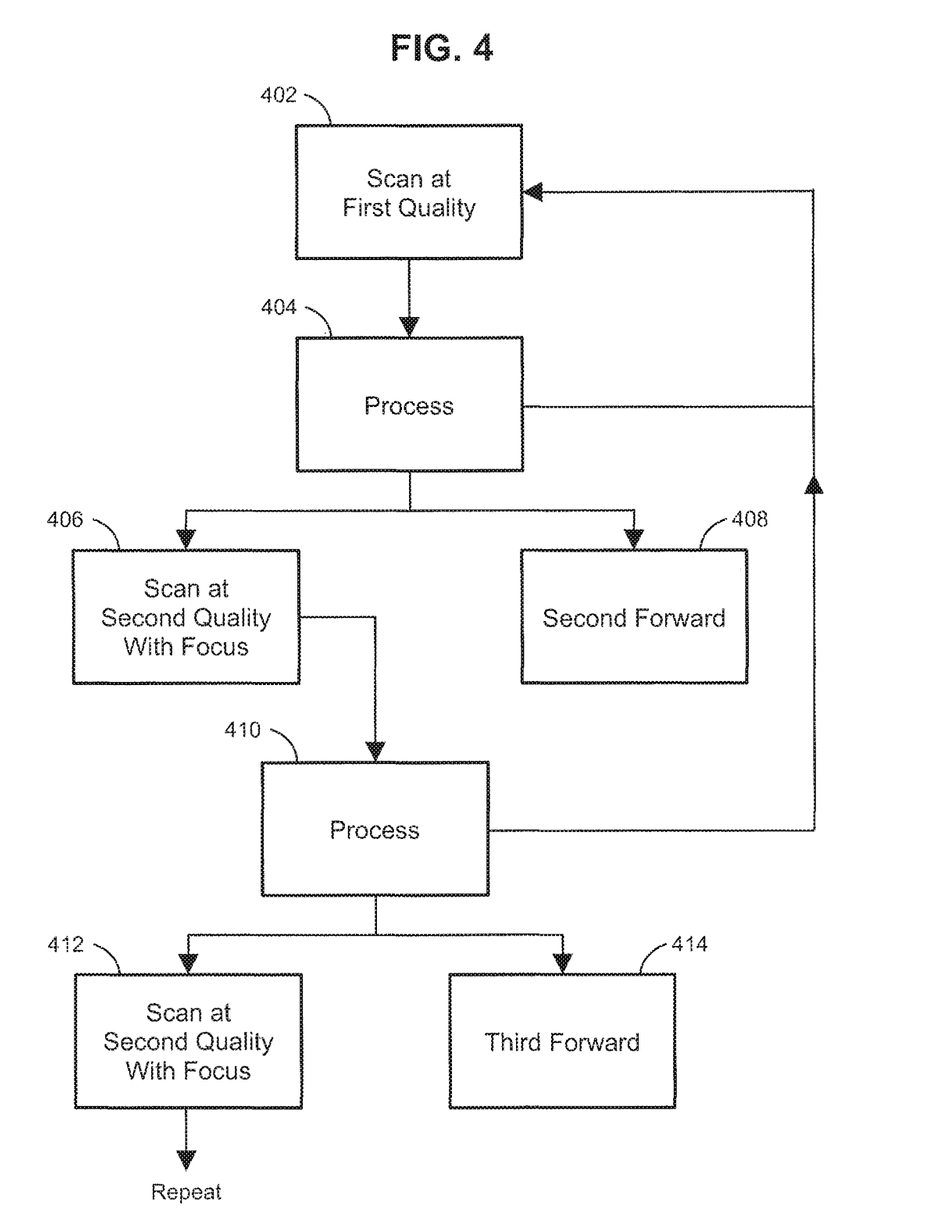
FIG. 4 is a block diagram of a method of scanning external vehicles.

Turning to FIG. 4, first vehicle 200 scans surrounding environment (e.g., traffic and parked vehicles) at a first, lower quality at block 306. The scan may be a 360 degree scan to capture all environment surrounding first vehicle 200. Thus, the scan may capture information about a large quantity of environment at a lower quality. The scan is performed with some or all of the local sensors 102 (e.g., cameras, ultrasonic sensors, infrared sensors, lidar sensors, radar sensors, etc.). According to some embodiments, the scan includes receiving security certificates of surrounding external vehicles.

At block 404, first vehicle 200 processes the scan. More specifically, first vehicle 200 determines whether any vehicles captured in the scan match the target vehicle. First vehicle 200 marks vehicles captured in the scan (referred to as scanned vehicles or captured vehicles) as being (a) incompatible, (b) potentially compatible, or (c) fully compatible. First vehicle 200 performs the processing, for example, and in part, by (a) applying commercially available image classification and/or recognition software to resolve vehicle features and (b) comparing resolved features (e.g., features resolved during (a) or resolved via other means, such as security certificates resolved via inter-vehicle communication) to the previously received target vehicle features.

According to some embodiments, only a predetermined number of features (e.g., one feature) must match features of the target vehicle for a scanned vehicle to be marked as potentially compatible. For example, if the instruction includes a license plate of the target vehicle and a model of the target vehicle and a vehicle with a matching model but a different license plate is found in the scan, then first vehicle 200 may continue with the process described in FIG. 4. If less than the predetermined number of features match features of the target vehicle (e.g., zero features), then the process returns to block 402.

It should be appreciated that the instruction received at block 302 may include a command for first vehicle 200 to query an external entity (e.g., an external server) to receive a new or updated instruction at a predetermined frequency. The original instruction and the new or updated instructions are collectively referred to as the instruction. First vehicle 200 applies the most recent instruction.

The instruction may include some or all of: (a) an expiration date causing first vehicle 200 to abandon scanning for the target vehicle, (b) an update frequency causing first vehicle 200 to update the instruction via the external entity at a predetermined interval, (c) features of the target vehicle and/or the target driver of the target vehicle, and (d) gravity indicators of the features of the target vehicle and/or the target driver of the target vehicle.

Group (c) may include some or all of: (i) a make of the target vehicle, (ii) a model of the target vehicle (including color), (iii) a complete or partial license plate of the target vehicle. Group (d) may include a gravity indicator for each feature of group (c). Each gravity indicator may provide (i) a consequence for an absence (i.e., an absence gravity) of a corresponding feature and (ii) a consequence for a positive presence of a corresponding feature (i.e., a presence gravity).

For example, a gravity indicator associated with model of the target vehicle may provide that scanned vehicles not matching the model should be marked as incompatible.

Thus, model of the target vehicle would have a high absence gravity. A gravity indicator associated with license plate of the target vehicle may have a low absence gravity such that vehicles having license plates not matching the license plate of the target vehicle should still be considered and thus marked as potentially compatible (i.e., the non-presence of a matching license plate does not cause block 404 to return to block 402 or block 410 to return to block 402). Thus, license plate of the target vehicle would have a low absence gravity. License plate, however, may be paired with a high presence gravity such that a scanned vehicle having a license plate matching the target vehicle is marked as fully compatible. As described below, each gravity indicator may include associated weights that inform or at least partially contribute to a confidence that first vehicle 200 calculates and assigns to potentially and/or fully compatible vehicles.

At block 404, first vehicle 200 considers each vehicle captured in the scan. Features of each vehicle are compared with the received features of the target vehicle. As stated above, vehicles are marked as incompatible, potentially compatible, or fully compatible based on the features of the target vehicle and the gravities associated with the features. First vehicle 200 determines whether any vehicles in the scan are potentially compatible or fully compatible. If all vehicles are incompatible, then first vehicle 200 returns to block 402. If at least one vehicle is potentially compatible or fully compatible, then first vehicle proceeds to blocks 406 and 408. During block 404, first vehicle 200 may attempt to uniquely identify each potentially compatible or fully compatible vehicle. The unique identification may be made with reference to the security certificates issued by the potentially compatible or fully compatible vehicles (i.e., first vehicle 200 attempts to pair received security certificates with resolved vehicles). If no security certificates are issued by the potentially compatible or fully compatible vehicles, then first vehicle 200 may assign a label or unique identifier to each potentially compatible or fully compatible vehicle.

At block 406, first vehicle 200 scans the potentially compatible and fully compatible vehicles at a higher quality. For example, first vehicle 200 may have scanned at block 402 with only ultrasonic sensors and now scans, at block 406 with ultrasonic sensors and cameras. Alternatively, first vehicle 200 may increase a resolution of images captured by the cameras or any of the other local sensors 102. First vehicle 200 may focus the scan on the potentially compatible and fully compatible vehicles. For example, instead of scanning at 360 degrees about first vehicle 200, first vehicle 200 may scan in particular directions corresponding to the locations (or expected locations) of the potentially compatible and fully compatible vehicles. It should thus be appreciated that when first vehicle 200 reaches block 406, first vehicle 200 may dedicate extra processing resources to scanning as compared with processing resources dedicated to scanning at block 402.

At block 408, first vehicle 200 performs a second forward. Here, first vehicle 200 transmits (a) a message to an external entity (e.g., a server) indicating that a potentially or fully compatible vehicle has been scanned or captured and/or (b) a message to nearby vehicles to scan at (i) an increased quality level, (ii) with focus in a particular area or with focus on particular vehicles. Put differently, the message to nearby vehicles may cause the vehicles to jump to block 406 of FIG. 4.

The message may instruct nearby vehicles to prioritize scanning (e.g., perform scans at a greater frequency or prioritize performing, process scans over other processing activities, and/or dedicate extra processing resources to scanning). The message may include various properties of the potentially compatible or fully compatible vehicle such as location, velocity (including heading), acceleration, resolved portions of the license plate, make, model (which may include color) etc. Each of the vehicles in the message may be marked as potentially compatible or fully compatible.

A size or bandwidth of the message may be based on a confidence associated with a potentially compatible or fully compatible vehicle. For example, fully compatible vehicles may be marked with a confidence of 1.0 (i.e., full confidence). Potentially compatible vehicles may be marked with a confidence between 0.0 and 1.0 based on a degree of matching between features of the scanned vehicle and features of the target vehicle. First vehicle 200 may calculate a confidence based on the associated weights included in the gravity indicators.

At confidence below a first level, first vehicle 200 may transmit a small (low bandwidth) message including text data embodying features of the potentially compatible vehicles. At a confidence at or above the first level and below a second level, first vehicle 200 may transmit a medium sized message (medium bandwidth) including the text data and compressed raw data reported by the local sensors 102 (e.g., low-resolution images from cameras). At a confidence at or above the second level, first vehicle 200 may transmit a large message (high bandwidth) including the text data and uncompressed raw data reported by the local sensors 102 (e.g., high-resolution images from the cameras).

At blocks 410, 412, and 414 first vehicle repeats the processes described with reference to blocks 404, 406, and 408. At block 410, however, first vehicle 200 processes the higher quality and focused scan of block 406. If only incompatible vehicles are identified, then first vehicle 200 returns to block 402. If potentially compatible or fully compatible vehicles are identified, then first vehicle 200 proceeds to blocks 412 and 414.

After, blocks 412 and 414, first vehicle 200 repeats blocks 410, 412, and 414 until only incompatible vehicles are identified in the subsequent scans. According to some embodiments, first vehicle 200 repeats blocks 410, 412, and 414 until at least a predetermined number of consecutive scans (e.g., 50 consecutive scans) fail to identify a potentially or fully compatible vehicle.

It should be appreciated that the frequency of repetition of blocks 410, 412, and 414 may be based on the confidence associated with a potentially or fully compatible vehicle. For example, when a potentially or fully compatible vehicle has a high confidence, blocks 410, 412, and 414 may be repeated at a high frequency. When a potentially compatible vehicle has a low confidence, blocks 410, 412, and 414 may be repeated at a low frequency.

Eventually, first vehicle 200 returns to block 402 and performs new or subsequent iterations of FIG. 4 until (a) the received instruction has expired and (b) first vehicle 200 has returned to block 402 (i.e., only incompatible vehicles were identified in previous scans). As stated above with reference to FIG. 3, first vehicle 200 is configured to receive updated instructions. After receiving updated instructions, first vehicle 200 performs subsequent iterations of block 306 shown in FIG. 4 with reference to the updated instructions.

Figure 5:
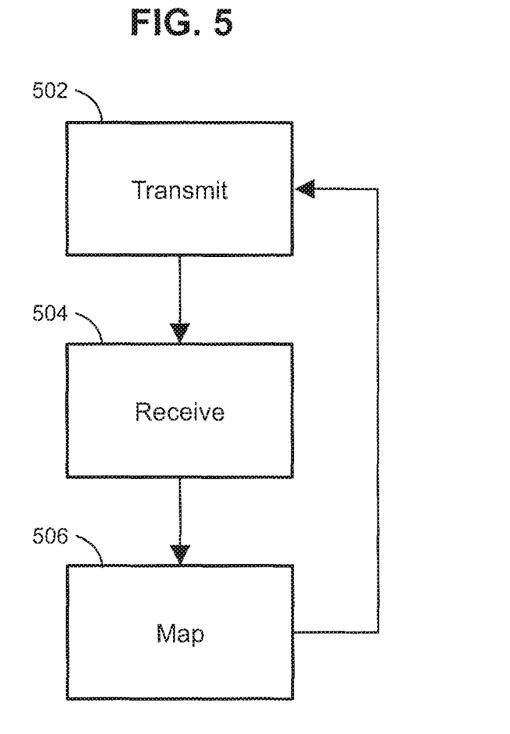
FIG. 5 is a block diagram of a method of generating one or more heat maps based on scans.

FIG. 5 is a method of mapping messages received from a plurality of connected vehicles at one or more external servers. At block 502, the servers transmit instructions. First vehicle 200 is configured to receive these instructions at block 302. The instructions thus include or embody any of the above-described features of the received instructions.

The instructions may be specifically transmitted to connected vehicles having specific coordinates. Alternatively, the instructions may instruct connected vehicles having coordinates outside of specific coordinates to ignore and/or discard the instructions. The specific coordinates may be any coordinates within a designated geoboundary (e.g., a state, a county, or a user-specified geoboundary).

At block 504, the servers receive messages forwarded from the connected vehicles at blocks 408 and 414 (and other messages transmitted by the vehicles after block 414 since blocks 410, 412, and 414 repeat until a vehicle resolves only incompatible vehicles and returns to block 402). As stated above, the messages include a mark of a detected vehicle (e.g., potentially compatible or fully compatible) and properties of the detected vehicle (e.g., location, velocity (which may include heading), acceleration, make, model, complete or partial license plate, security certificate (if present) and unique label (if the security certificate is not present)). The forwarded messages may further include images of the sensor views captured by the connected vehicles (e.g., images recorded by cameras of the connected vehicles containing the partially compatible or fully compatible vehicles).

At block 506, the servers map potentially compatible and fully compatible vehicles. The map may be user-viewable and transmitted to a plurality of locations. The map may be filterable or adjustable, such that the servers are configured to filter or adjust the map based on user-selected option (e.g., only show fully compatible vehicles, only show partially compatible vehicles matching a make and model of the target vehicle). Some views of the map may be heat maps showing a frequency of identification or potentially or fully compatible vehicles. The heat maps may be normalized by traffic density such that an identification in a high density traffic area is given a lower weight than an identification in a low density traffic area.

After block 506, the servers return to block 502 and transmit updated instructions. When a fully compatible vehicle or a potentially compatible vehicle with a confidence above a predetermined level has been identified, the servers may automatically instruct connected vehicles within a predetermined radius of the location of said vehicle to skip blocks 402, 404, 408 and proceed directly to block 406. The servers may be configured to automatically increase a radius of search (e.g., the above-described geoboundary) based on time and an absence of a detected fully compatible vehicle.

Figure 7:
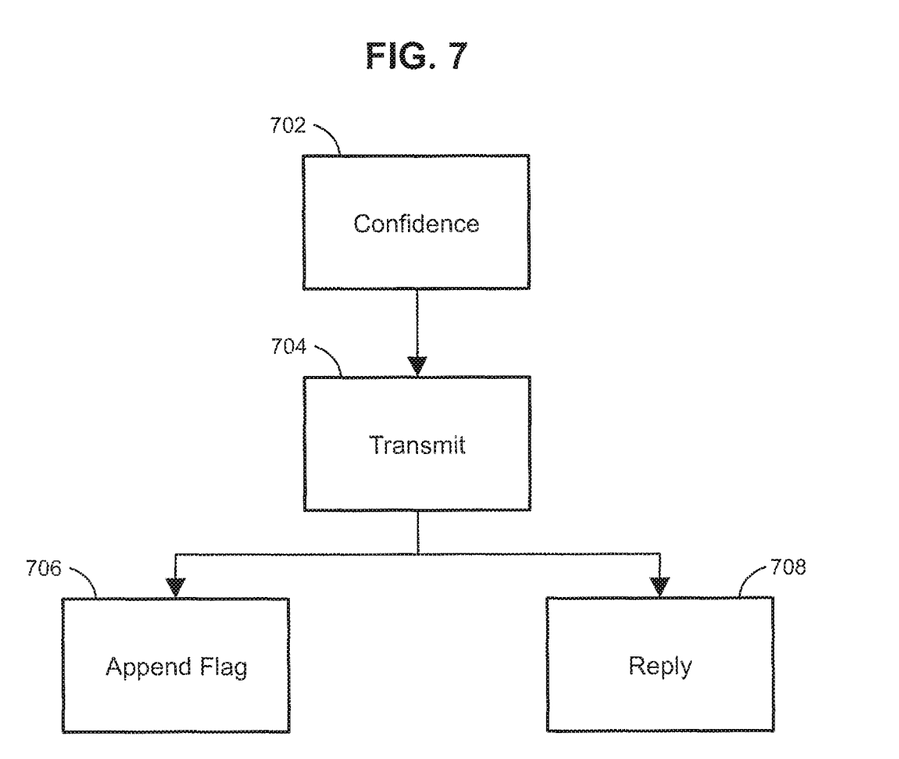
FIG. 7 is a block diagram of a method of communicating with a compatible vehicle.

With reference to FIG. 7, the external servers of FIG. 5 may be configured to automatically contact a potentially compatible vehicle or a fully compatible vehicle having a confidence above a predetermined flagging confidence level. At block 702, the external servers compare the confidence associated with the vehicle to the predetermined flagging confidence level. If the confidence exceeds the predetermined level, then the external servers transmit a flagging instruction to the potentially or fully compatible vehicle at block 704.

The flagging instruction may include (a) an instruction to append a flag to inter-vehicle broadcasts made by the potentially or fully compatible vehicle (block 706) and (b) an instruction to reply to the external servers with information recorded by identified local sensors of the potentially or fully compatible vehicle (block 708). The identified local sensors may include seatbelt sensors, seat weight sensors, vehicle location, vehicle velocity, vehicle acceleration, routes entered into navigation software, and/or route or location history.

Figure 6:
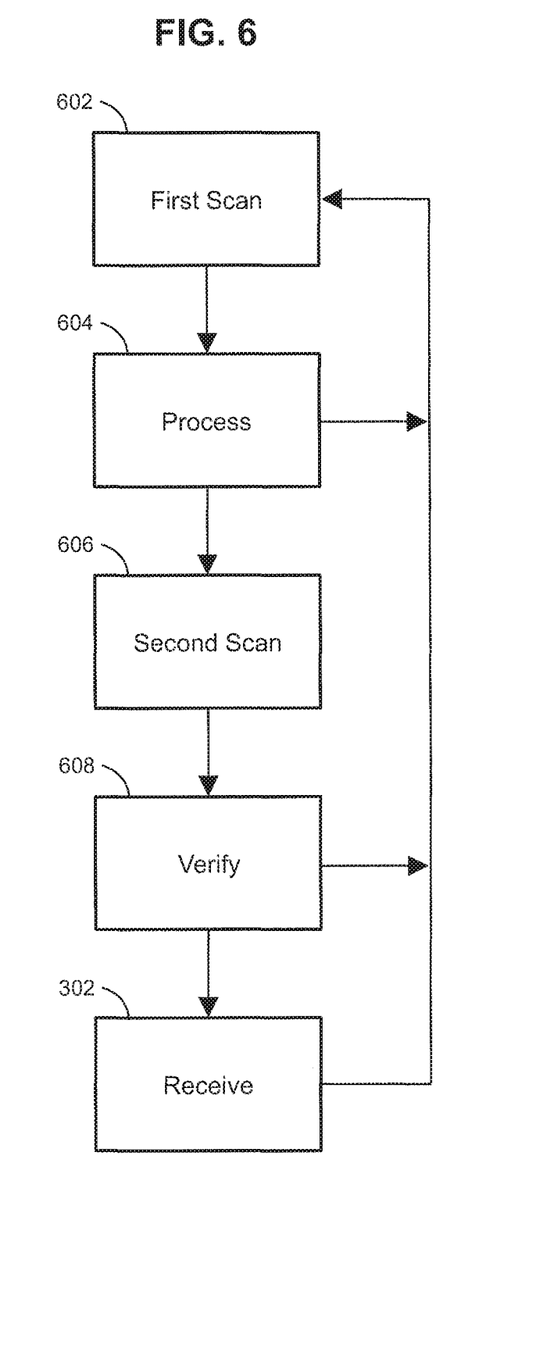
FIG. 6 is a block diagram of a method of scanning road signs for instructions.

Turning to FIG. 6, first vehicle 200 is configured to identify road signs containing instructions. Put differently, first vehicle 200 may receive instructions at block 302 from external entities (e.g., other connected vehicles, the servers referenced in FIG. 5) or from road signs. The road signs may be electronic billboards posted above highways. As discussed below, first vehicle 200 verifies the road signs to ensure that the road signs are authoritative (i.e., a credentialed authority is the source of the road sign).

At block 602, first vehicle 200 scans for road signs with local sensors 102 (e.g., with cameras). At block 604, first vehicle 200 processes the scans to determine if a relevant road sign has been detected. A relevant road sign may include special markings such as the term "amber alert" or any other predetermined features such as yellow text contrasted with a black background.

At block 606, first vehicle 200 performs a second scan of the road sign. The second scan may be at a higher resolution than the first scan. The second scan may be focused toward the location of the relevant road sign. As with all features described herein, block 606 is optional and thus blocks 604 and 608 may be performed on a single scan captured at block 602.

At block 608, first vehicle 200 processes the second scan to (a) determine features of the instruction, such as features of the target vehicle and an electronic location of an external server responsible for managing the location of the target vehicle (e.g., the external server of FIG. 5); and (b) verify that the road sign is authoritative. First vehicle 200 may verify a road sign is authoritative when the road sign (a) has a certain size, (b) is placed at a certain height above road, and/or (c) has certain color or contrast features (e.g., yellow text on black background).

After block 608, first vehicle 200 proceeds to block 302 of FIG. 3. It should be appreciated that in addition to the road sign being verified at block 608, the instructions embodied in the road sign may be verified (as described above) at block 304 by contacting the preloaded address of the external server.

The invention claimed is:

1. A vehicle comprising a processor configured to:
motor(s), local sensors, and processor(s) configured to:
receive an instruction comprising a first set of properties of a target vehicle, wherein the instruction comprises a first weight associated with a first property of the first set of properties and a second weight associated with a second property of the first set of properties, wherein the first weight is greater than the second weight;
verify the instruction;
instruct the local sensors to scan at a first resolution;
mark a scanned external vehicle, having a second set of properties, as compatible or incompatible based on a comparison of the first set of properties of the target vehicle and the second set of properties of the scanned external vehicle, and on a determination that the first property of the first set of properties and a first property of the second set of properties match; and
instruct the local sensors to scan at a second resolution that is greater than the first resolution upon marking the external vehicle as compatible.

2. The vehicle of claim 1, wherein the processor(s) are configured to forward, by the vehicle, an instruction to surrounding vehicles to scan for the target vehicle.

3. The vehicle of claim 1, wherein the local sensors are cameras configured to capture images at the first and second resolutions or ultrasonic sensors, wherein the processor(s) are configured to verify the instruction by contacting an external server at a preloaded address, and wherein the processor(s) are configured to pull the preloaded address from memory and without reference to the received instruction.

4. The vehicle of claim 1, wherein the processor(s) are configured to instruct the local sensors to scan at the second resolution until a predetermined number of subsequent scans fail to include the compatible external vehicle.

5. The vehicle of claim 1, wherein mark the external vehicle as being compatible is further based on a determination that a threshold number of matches are identified between the first set of properties and the second set of properties, the threshold number of matches being less than a total number of properties included in the first set of properties.

6. The vehicle of claim 1, wherein the processor(s) are configured to further mark the compatible external vehicle as potentially compatible and fully compatible.

7. The vehicle of claim 6, wherein the processor(s) are configured to compute a compatibility confidence when the external vehicle is potentially compatible.

8. The vehicle of claim 7, wherein the compatibility confidence is based on the comparison of the first and second properties and gravities included in the received instruction.

9. The vehicle of claim 8, wherein the processor(s) are configured to compare the compatibility confidence to a threshold confidence and transmit raw images of the external vehicle based on the compatibility confidence exceeding the threshold confidence.

10. A method of controlling a vehicle, the vehicle comprising motor(s), local sensors, and processor(s), the method comprising, via the processor(s):
    identifying a road sign including information about a target vehicle based on a scan by the local sensors, the target vehicle including first properties;
    extracting the information about the target vehicle from the road sign using a scan by the local sensors;
    instructing the local sensors to scan at a first resolution;
    marking a scanned external vehicle, having second properties, as compatible or incompatible based on a comparison of the first and second properties; and
    instructing the local sensors to scan at a second resolution that is greater than the first resolution upon marking the scanned external vehicle as compatible.

11. The method of claim 10, wherein the second resolution exceeds the first resolution, the local sensors are cameras configured to capture images at the first and second resolutions, and the method comprises: forwarding a verified instruction to surrounding vehicles and not forwarding an unverified instruction to surrounding vehicles.

12. The method of claim 11, comprising pulling a preloaded address from memory and verifying the instruction by contacting an external server at the preloaded address.

13. The method of claim 12, comprising: instructing the local sensors to scan at the second resolution until a predetermined number of subsequent scans fail to include the compatible external vehicle.

14. The method of claim 13, comprising:
    marking the compatible external vehicle as potentially compatible or fully compatible;
    computing a compatibility confidence when the external vehicle is potentially compatible, wherein the compatibility confidence is based on the comparison of the first and second properties and gravities included in the received instruction; and
    comparing the compatibility confidence to a threshold confidence and transmitting raw images of the external vehicle based on the compatibility confidence exceeding the threshold confidence.

15. The vehicle of claim 2, wherein the processor(s) are further configured to forward, based on marking the scanned external vehicle as compatible, a second instruction to the surrounding vehicles to prioritize scans for the target vehicle over other processing activities.

16. The vehicle of claim 2, wherein the instruction to the surrounding vehicles comprises an instruction to scan at a first resolution, and wherein the processor(s) are further configured to forward, based on marking the scanned external vehicle as compatible, a second instruction to the surrounding vehicles to scan for the target vehicle at a second resolution that is greater than the first resolution.

17. The vehicle of claim 2, wherein the instruction to the surrounding vehicles comprises an instruction to scan at a first resolution, and wherein the processor(s) are further configured to forward, based on marking the scanned external vehicle as compatible, a second instruction to the surrounding vehicles to scan a particular feature of the target vehicle.

18. The vehicle of claim 1, wherein receive the instruction comprising first properties of the target vehicle further comprises:
    identify a road sign including information about the target vehicle based on a scan by the local sensors at a first resolution; and
    extract the information about the target vehicle from the road sign using a scan by the local sensors at a second resolution.

19. The vehicle of claim 2, wherein the processor(s) are further configured to:
    send a first low-bandwidth message to the surrounding vehicles; and
    receive, from a first vehicle of the surrounding vehicles, an response message indicating that the first vehicle has not received a prior instruction to scan for the target vehicle, and wherein forward the instruction to surrounding vehicles to scan for the target vehicle is based on the response message from the first vehicle.

20. A vehicle comprising:
    motor(s), local sensors, and processor(s) configured to:
    receive an instruction comprising first properties of a target vehicle;
    verify the instruction;
    instruct the local sensors to scan at a first resolution;
    mark a scanned external vehicle, having second properties, as compatible or incompatible based on a comparison of the first and second properties;
    instruct the local sensors to scan at a second resolution that is greater than the first resolution upon marking the scanned external vehicle as compatible;
    send a first low-bandwidth message to surrounding vehicles;
    receive, from a first vehicle of the surrounding vehicles, a response message indicating that the first vehicle has not received a prior instruction to scan for the target vehicle; and
    forward, based on the response message from the first vehicle, an instruction to the first vehicle to scan for the target vehicle.

21. A vehicle comprising:
    motor(s), local sensors, and processor(s) configured to:
    receive an instruction comprising first properties of a target vehicle;

verify the instruction;
instruct the local sensors to scan at a first resolution;
mark, a scanned external vehicle, having second properties, as compatible or incompatible based on a comparison of the first and second properties;
instruct the local sensors to scan at a second resolution that is greater than the first resolution upon marking the scanned external vehicle as compatible; and
forward, based on marking the scanned external vehicle as compatible, a second instruction to the surrounding vehicles to prioritize scans for the target vehicle over other processing activities.

22. A vehicle comprising:
motor(s), local sensors, and processor(s) configured to:
receive an instruction comprising first properties of a target vehicle;
verify the instruction;
instruct the local sensors to scan at a first resolution;
mark, a scanned external vehicle, having second properties, as compatible or incompatible based on a comparison of the first and second properties;
instruct the local sensors to scan at a second resolution that is greater than the first resolution upon marking the scanned external vehicle as compatible; and
forward, by the vehicle, an instruction to surrounding vehicles to scan for the target vehicle, wherein the instruction to the surrounding vehicles comprises an instruction to scan at a first resolution, and wherein the processor(s) are further configured to forward, based on marking the scanned external vehicle as compatible, a second instruction to the surrounding vehicles to scan for the target vehicle at a second resolution that is greater than the first resolution.

23. A vehicle comprising:
motor(s), local sensors, and processor(s) configured to:
receive an instruction comprising first properties of a target vehicle;
verify the instruction;
instruct the local sensors to scan at a first resolution;
mark, a scanned external vehicle, having second properties, as compatible or incompatible based on a comparison of the first and second properties;
instruct the local sensors to scan at a second resolution that is greater than the first resolution upon marking the scanned external vehicle as compatible; and
forward, by the vehicle, an instruction to surrounding vehicles to scan for the target vehicle, wherein the instruction to the surrounding vehicles comprises an instruction to scan at a first resolution, and wherein the processor(s) are further configured to forward, based on marking the scanned external vehicle as compatible, a second instruction to the surrounding vehicles to scan a particular feature of the target vehicle.

* * * * *